United States Patent [19]
Goor

[11] Patent Number: 6,042,181
[45] Date of Patent: Mar. 28, 2000

[54] CONVERTIBLE CHILD SAFETY SEAT

[75] Inventor: Dan Goor, Colorado Springs, Colo.

[73] Assignee: XSCI, Inc., Colorado Springs, Colo.

[21] Appl. No.: 09/170,383

[22] Filed: Oct. 13, 1998

Related U.S. Application Data

[60] Provisional application No. 60/061,889, Oct. 14, 1997, and provisional application No. 60/065,818, Nov. 14, 1997.

[51] Int. Cl.[7] ........................................................ B60N 2/28
[52] U.S. Cl. ................................ 297/216.11; 297/256.14; 297/256.15; 297/256.16
[58] Field of Search .......................... 297/216.11, 256.14, 297/256.15, 256.16

[56] References Cited

U.S. PATENT DOCUMENTS

| | | | |
|---|---|---|---|
| 3,861,742 | 1/1975 | Leonard et al. | 297/216.11 |
| 4,681,368 | 7/1987 | Heath et al. | 297/216.11 |
| 4,707,024 | 11/1987 | Schrader | 297/256.14 |
| 5,468,014 | 11/1995 | Gimbel et al. | 297/216.11 X |
| 5,524,965 | 6/1996 | Barley | 297/256.16 |
| 5,842,737 | 12/1998 | Goor | 297/216.11 |

*Primary Examiner*—Peter R. Brown
*Attorney, Agent, or Firm*—Weingarten, Schurgin, Gagnebin & Hayes LLP

[57] ABSTRACT

The convertible child safety seat of the present invention provides improved occupant protection in all vehicles, and especially in vehicles equipped with a passenger-side airbag. The child safety seat includes an air bag deflector to deflect an expanding air bag away from the infant and is shock-mounted to reduce crash and airbag energy the occupant is exposed or subjected to. The child safety seat is convertible from a rearward facing position to a forward facing position. The cradle of the safety seat is removable. Additionally, to accommodate the changing size of the child a knee bracket is provided which allows a larger size child to be safely transported within the child safety seat.

10 Claims, 12 Drawing Sheets

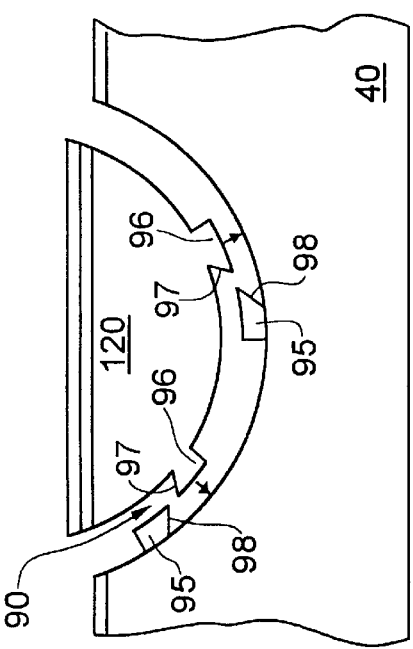
FIG. 18
FIG. 17
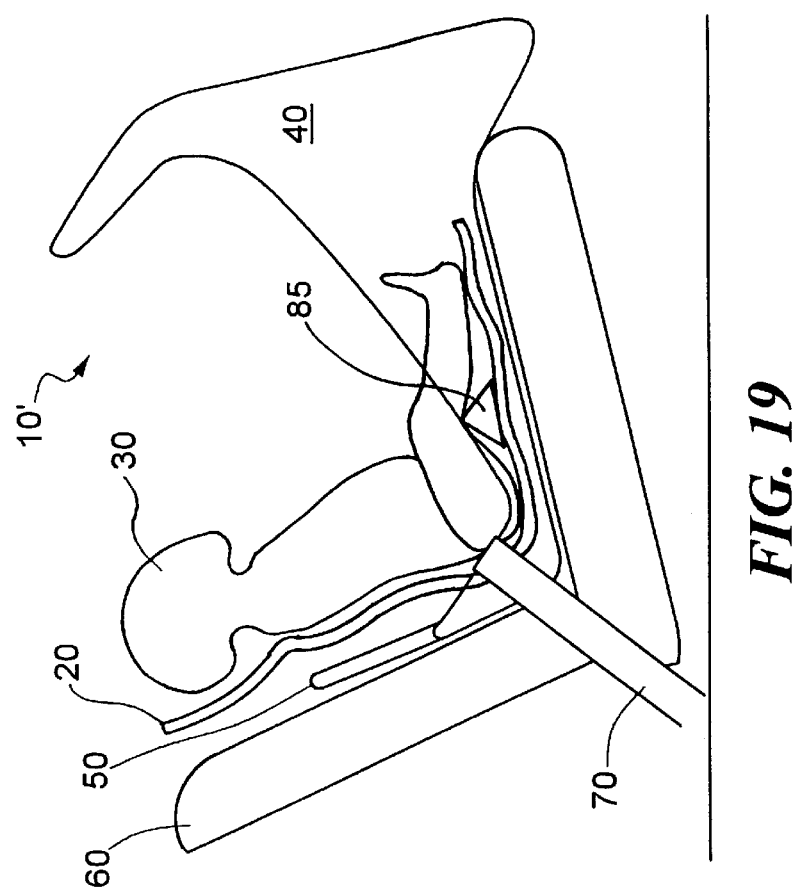
FIG. 19

CONVERTIBLE CHILD SAFETY SEAT

CROSS REFERENCE TO RELATED APPLICATIONS

This application claims priority under 35 U.S.C. §119(e) to provisional patent application serial No. 60/061,889 filed Oct. 14, 1997 and provisional patent application No. 60/065,818 filed Nov. 14, 1997, the disclosures of which are hereby incorporated by reference.

STATEMENT REGARDING FEDERALLY SPONSORED RESEARCH OR DEVELOPMENT

Not Applicable

BACKGROUND OF THE INVENTION

Many states have passed laws which mandate the use of a child safety seat for children up to the age of four years old. In recent years, an increasing number of vehicles have been equipped with passenger-side airbags with the expectation that all automobiles produced in the United States will be so equipped, and by 1999, passenger-side airbags will be federally mandated for all new vehicles, including light trucks.

Although child seat manufacturers routinely warn purchasers to secure the child safety seat in the center of the rear-seat when there is an airbag in the car, it is not uncommon for the seat to be placed in the front, passenger-side seat. For the sake of safety alone, if not for passenger side airbag, then rearfacing infants should be placed in the front seat to avoid distractions from the back seat which contribute to crashes and to allow for infant driver eye contact thus adding to the infant's feeling of security. That not withstanding, the failure to follow the manufacturer's instructions presents a serious safety risk to an infant in a rearfacing safety seat positioned in front of a passenger side air bag.

A significant body of data has shown that the interaction between a rear facing infant seat and a front passenger-side airbag can result in excessive head and chest acceleration, causing serious and perhaps fatal injury to an infant occupant. For example, the airbag/seat interaction produces accelerations of an infant's head exceeding 100 G's at bag impact and Head Injury Criterion (HIC) values ranging from 650 to 1300. By contrast, rear facing seats not experiencing airbag interaction produce head accelerations of about 50 G's and HIC values less than 1000 and generally around 650 when crash tested at a standardized test speed of 48 km/hr, even though the Child Restraint Air Bag Interaction (CRABI) task force recommends 390 HIC as the top acceptable number for infant safety.

Infants are usually transported in rear facing car seats, and as the infant grows and becomes larger, they are typically migrated into forward facing car seats. Usually this requires the purchase of a new car seat. Additionally, as the infant grows he or she may outgrow the first forward facing car seat, requiring the purchase of another, larger sized forward facing car seat.

It would therefore be desirable to provide a child safety seat that will protect a child when the safety seat is installed in the front passenger-side seat in a vehicle which may or may not be equipped with a passenger side airbag, and to provide a child safety seat that is convertible from a rearward facing position to a forward facing position and that can accommodate the child as the child grows.

BRIEF SUMMARY OF THE INVENTION

The present invention overcomes the disadvantages described above by providing improved occupant protection in all vehicles, with particular enhancement in vehicles equipped with a passenger-side airbag. The child safety seat includes an air bag deflector to deflect an expanding air bag away from the infant. The child safety seat is convertible from a rearward facing position to a forward facing position. The cradle of the safety seat is removable. Additionally, to accommodate the changing size of the child a knee bracket is provided which allows a larger size child to be safely transported within the child safety seat.

BRIEF DESCRIPTION OF THE SEVERAL VIEWS OF THE DRAWING

The invention will be more fully understood by reference to the following detailed description when considered in conjunction with the accompanying drawings, in which:

FIG. 17 is a side view of a mechanism for the removable cradle of the child safety seat;

FIG. 18 is a side view of a knee bracket; and

FIG. 19 is a diagrammatic side view of a child safety seat including the knee bracket of FIG. 18.

DETAILED DESCRIPTION OF THE INVENTION

Figure 1:
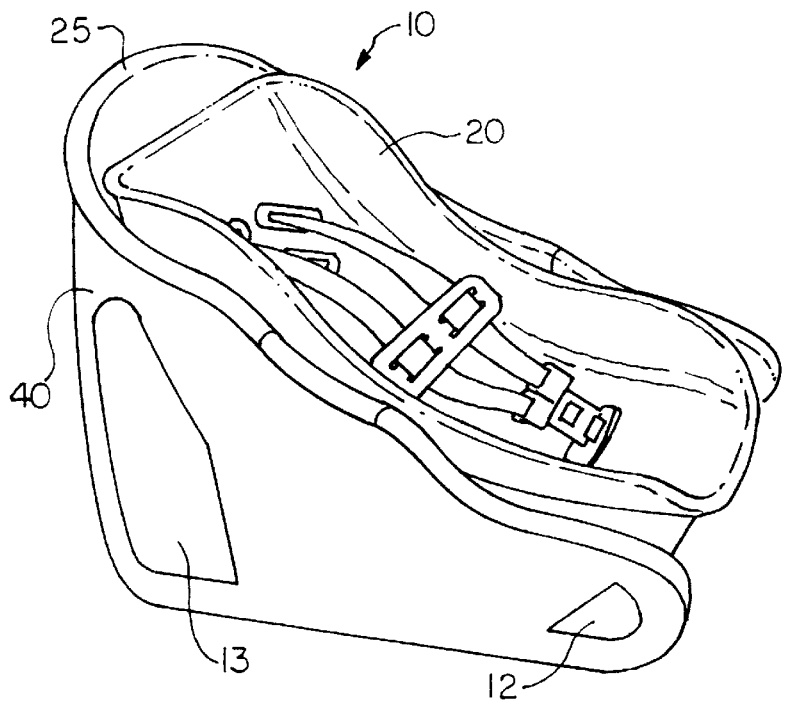
FIG. 1 is a view of the convertible child safety seat of the present invention.

A convertible child safety seat which can be used with the occupant either facing rearward or facing forward within the seat is presented. Referring to FIG. 1, the seat 10 includes a frame 25 having a cradle 20 removably secured thereto. The seat 10 further comprises an airbag deflector 40 which surrounds and is a part of the frame 25. The air bag deflector may be integrated as part of the frame or may be a separate element which attaches to and surrounds a portion of the frame. The air bag deflector is operative to deflect an expanding air bag away from an infant seated within the cradle 20 of the seat 10. The air bag deflector/frame 40, 25 both absorb and transfer a majority of the force imparted by the deploying air bag to the vehicle seat. The removable cradle 20 can be installed within the frame 25 in a first position in which an infant seated within the safety seat would be facing rearward as shown in FIGS. 5–8, or in a second position in which the infant 30 seated within the safety seat 10 would be facing forward as shown in FIGS. 9–16. The convertible car seat may further include an anti-kick bar 50 at a second end of the frame 40 shown in FIGS. 5–16. The seat 10 also includes a front orifice 12 for allowing a seat belt to pass therethrough for securing the safety seat to the automobile passenger seat when the safety seat 10 is used in a rearward facing position, and a rear orifice 13 for allowing a seat belt to pass therethrough for securing the safety seat to the automobile passenger seat when the safety seat is used in a forward facing position.

Figure 2:
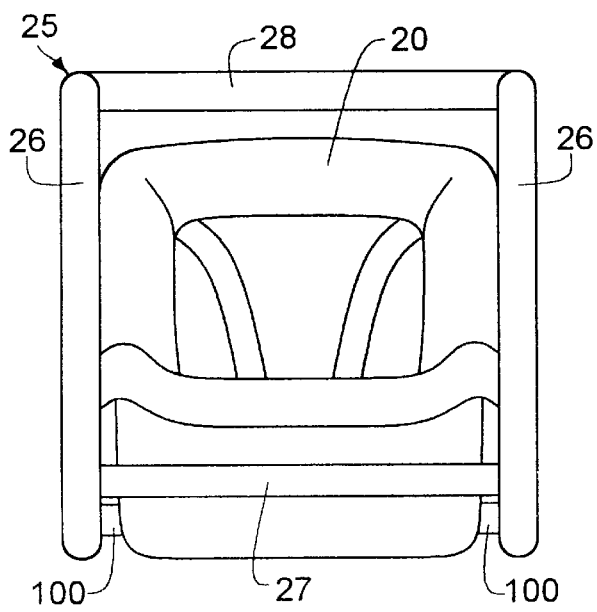
FIG. 2 is a front view of the frame and cradle of the child safety seat of FIG. 1.

Referring now to FIG. 2, a view of the frame and cradle only are presented. The frame 25 in this embodiment is comprised of side pieces 26 which are generally parallel to each other, top piece 28 and bottom piece 27. The top piece 28 and bottom piece 27 mechanically interconnect the side pieces 26 to each other. While a four piece frame is shown, it should be understood that a unitary frame or a frame comprising any number of pieces could also be utilized. The cradle 20 is mounted to the frame 25 by way of shock mounts 100, shown in FIG. 3. Additionally, while the cradle is shown shock-mounted to the frame, the cradle could be attached to the frame by any other mechanisms known in the art. The top piece 28 of frame 25 may be used as a carrying handle.

Figure 3:
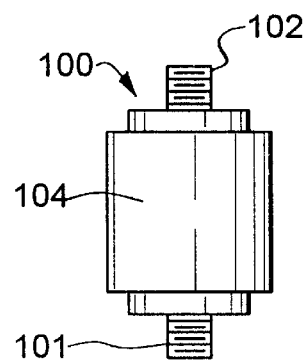
FIG. 3 is a view of a shock mount.

FIG. 3 shows a typical shock mount 100 which is used to removably secure the cradle to the frame. Shock mount 100 has a pair of opposing threaded ends 101, 102 and a center piece 104 of resilient material. The shock mount aids in isolating the cradle from forces experienced by the frame. The shock mount can be an integrally molded part of either the frame or cradle.

Figure 4:
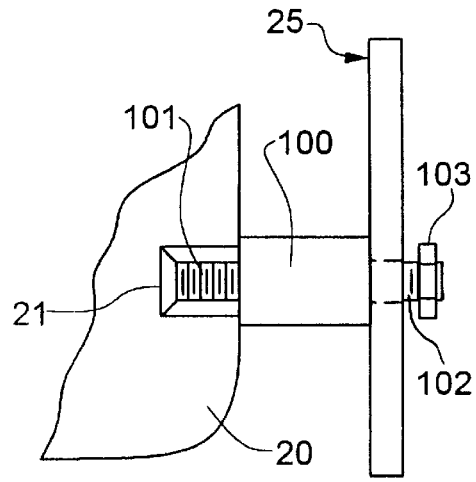
FIG. 4 is a view of the shock mounted cradle and frame.

Referring now to FIG. 4, a sectional view of the cradle shock mounted to the frame is shown. One of the ends 101 of shock mount 100 is received within threaded orifice 21 of cradle 20. The opposite threaded end 102 is positioned through frame 25 where it is secured in position by a threaded bolt 103. As such, the cradle 20 is shock mounted to the frame 25 with the shock mounts providing for measurable isolation of the cradle from forces applied to the frame. It should be understood that any number of shock mounts, absorbent materials or shock mounting configurations including but not those directly limited to mounts molded directly to the frame or cradle may be used to mount the cradle to the frame.

Figure 5:
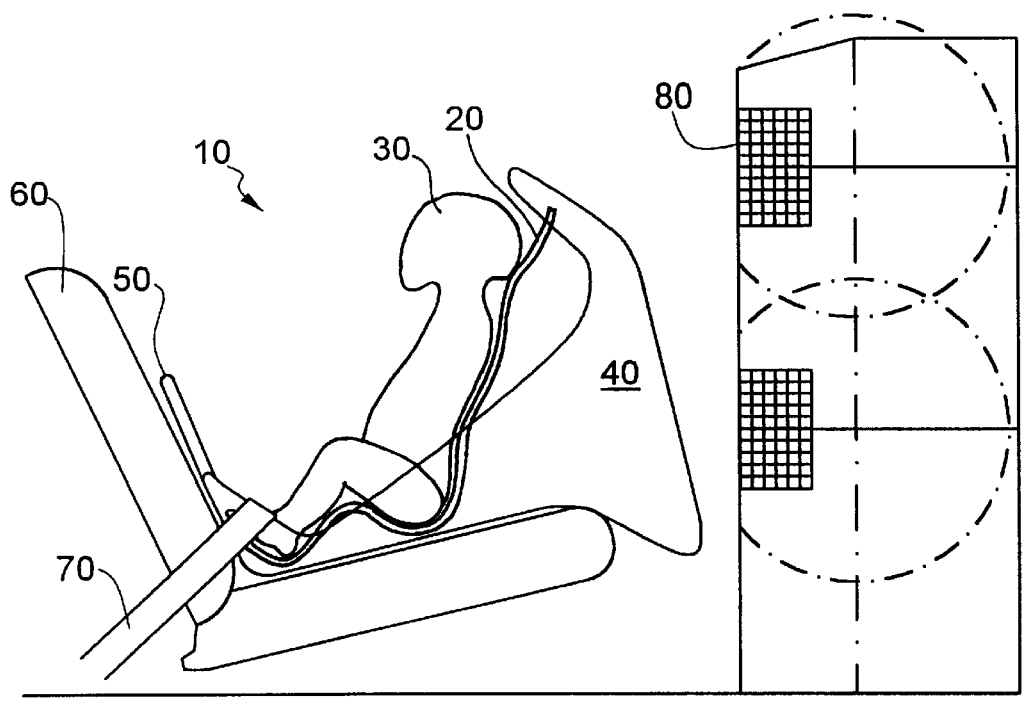
FIG. 5 is a diagrammatic side view of the child safety seat of the present invention in a rearward position installed in a vehicle.

An analysis of the rear facing convertible child seat during a frontal impact of a vehicle is shown in FIGS. 5–8. Referring to FIG. 5, the convertible child safety seat 10 is shown installed in the passenger side front seat 60 of a motor vehicle. A seat belt 70 aids in securing the safety seat 10 to the front seat 60 of the vehicle.

Figure 6:
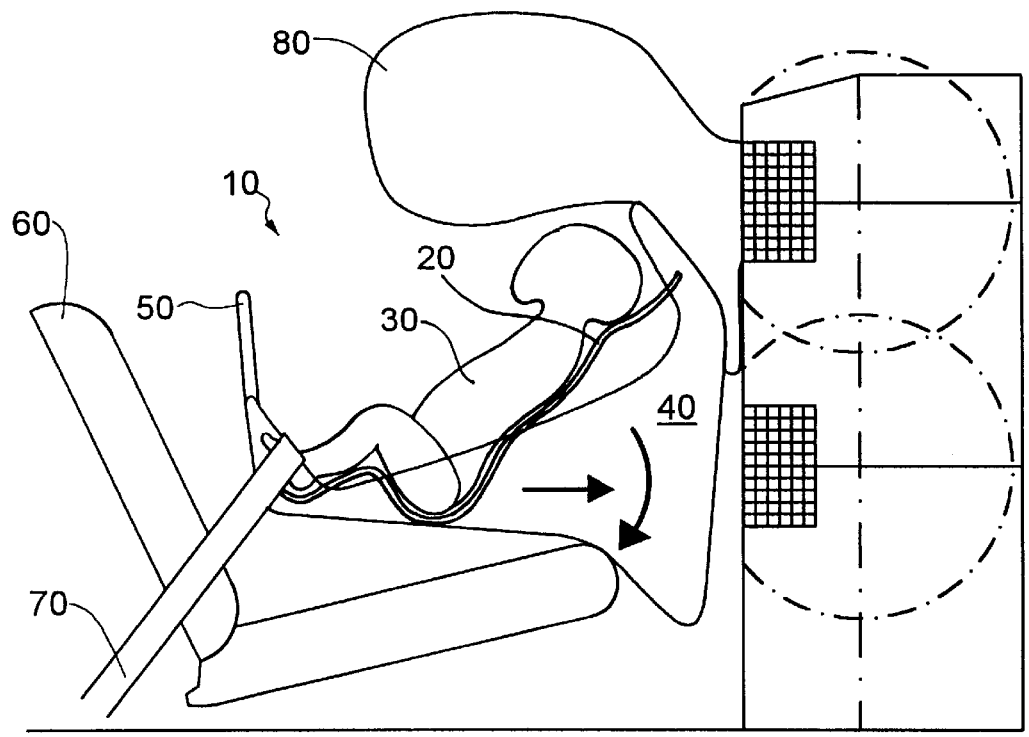
FIG. 6 is a diagrammatic side view of the child safety seat of FIG. 5 as an air bag begins to inflate.

Referring now to FIG. 6 the convertible safety seat 10 is shown approximately 30 milliseconds after a frontal impact. At approximately 30 milliseconds after impact the air bag 80 has partially deployed. The air bag 80 has impacted the convertible car seat frame 25 and air bag deflector 40. The frame 25 and deflector 40 tension passenger seat belt 70 and start to rotate upwards towards the front of the vehicle. Additionally, the frame 25 and air bag deflector 40 may impact the vehicle dashboard. In this event the infant or child is largely isolated from this impact.

Figure 7:
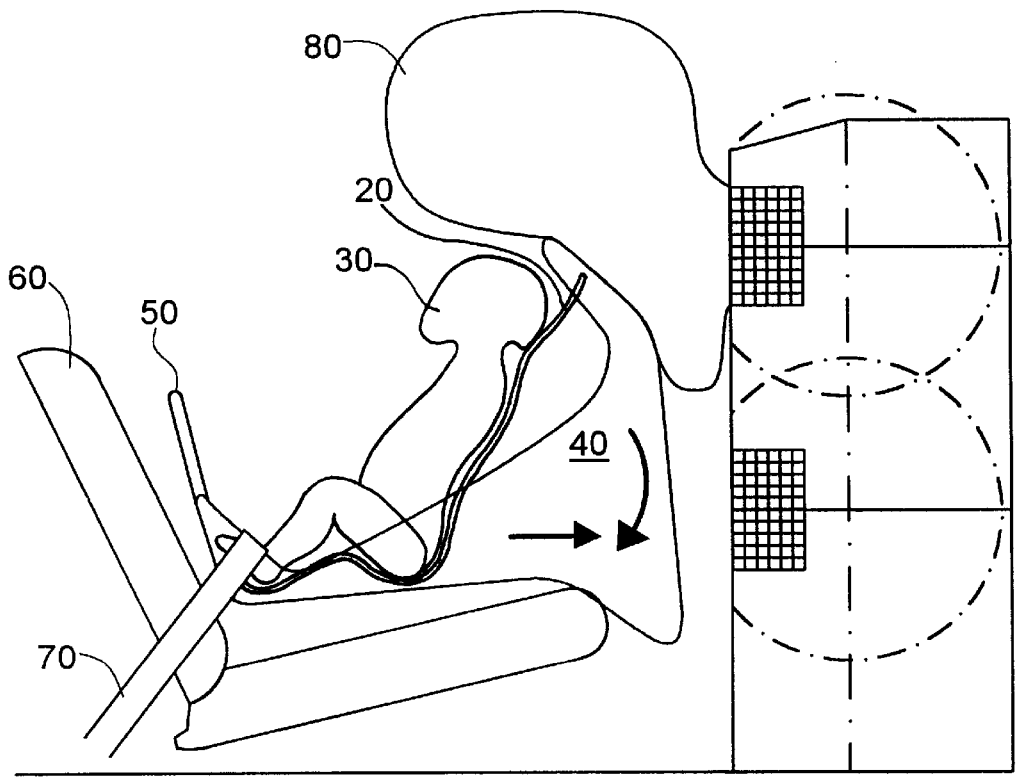
FIG. 7 is a diagrammatic side view of the child safety seat of FIG. 5 with the air bag fully inflated.

As shown in FIG. 7, at a time of 40–50 milliseconds after impact the largest motion of the frame and deflector 40 and the shock mounted cradle 20 occurs. The deflector 40 has tensioned the seat belt 70 to its elastic limit and in doing so, the infant 30 has translated and rotated within the frame and deflector 40. Maximum motion of the infant 30 relative to the deflector 40 is approximately three transitional and rotational inches. The seat 10 translates approximately four to five inches towards the front of the vehicle. The air bag 80 is at its maximum inflation. Further, the air bag 80 has been deflected above and over the infant 30 by air bag deflector 40 and thus air bag 80 does not come into contact with the infant 30 or infant cradle 20.

Figure 8:
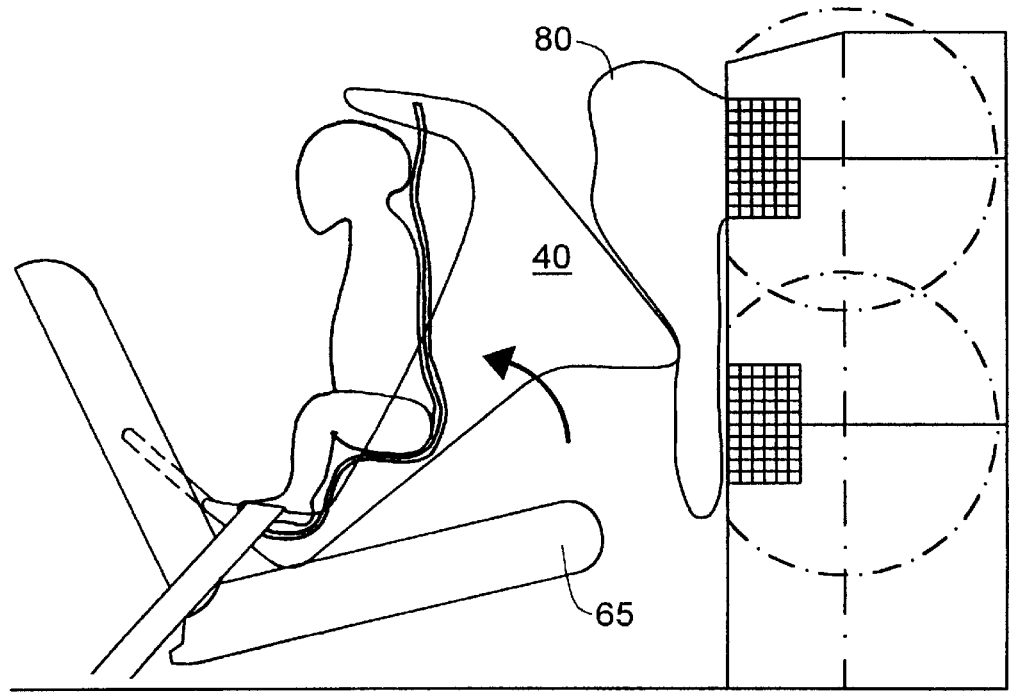
FIG. 8 is a diagrammatic side view of the child safety seat of FIG. 5 as the air bag begins to deflate.

Referring now to FIG. 8, at approximately 70 milliseconds after impact the safety seat 10 rebounds from compressing the auto seat cushion 65. The rebound is dampened by the anti-kick bar 50 disposed at the front of the safety seat 10. Without the anti-kick bar 50 the rebound is similar to that of a conventional seat in a crash without an air bag.

Figure 9:
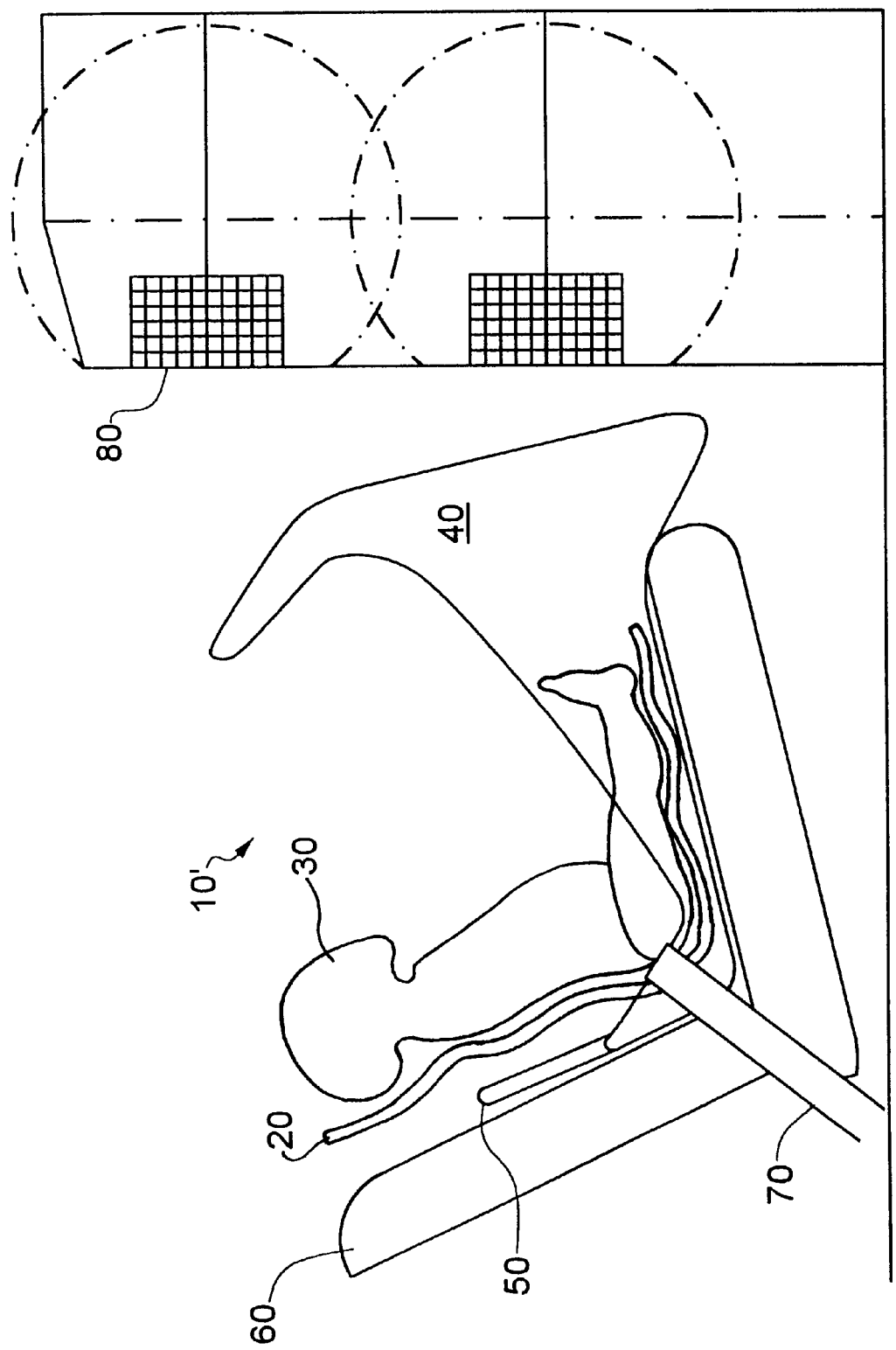
FIG. 9 is a diagrammatic side view of the child safety seat of the present invention in a forward position installed in a vehicle.

The convertible child seat 10 can also be used in a forward facing orientation. As shown in FIG. 9, in this embodiment 10' the cradle 20 is disposed at the second end of the frame/deflector 25/40. The seat is mounted in the vehicle in a manner similar to the embodiment 10, with the difference that the occupant 30 is now forward facing. Since the infant is usually larger a larger cradle will typically be substituted for the original cradle used in the rearward facing embodiment.

Figure 10:
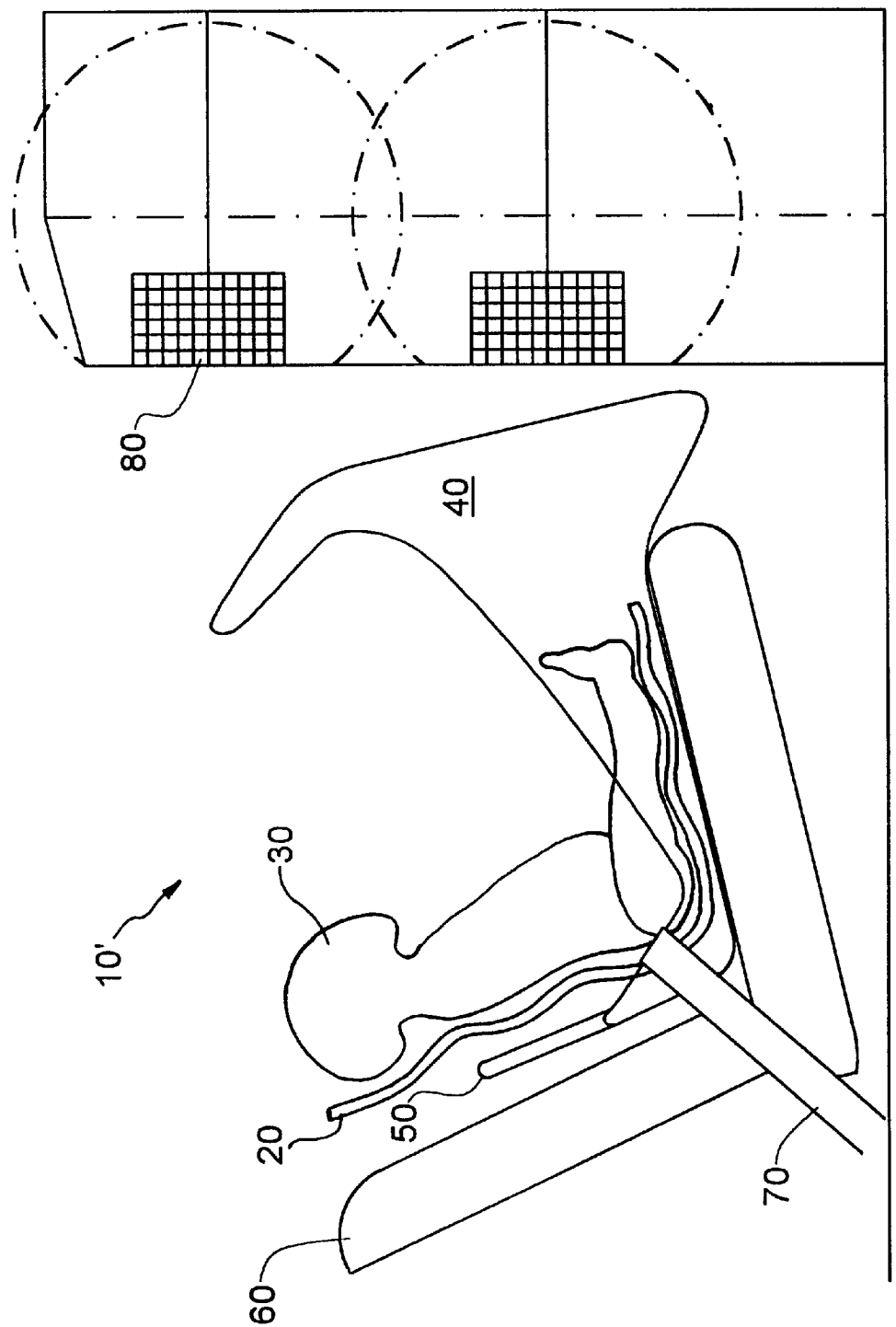
FIG. 10 is a diagrammatic side view of the child safety seat of FIG. 9 immediately after impact.

Referring now to FIG. 10, at approximately ten milliseconds after impact the seat 10' and child 30 move forward as the seat belt 70 stretches. The second end of the frame and the anti-kick bar 50 are no longer abutting the seat 60.

Figure 11:
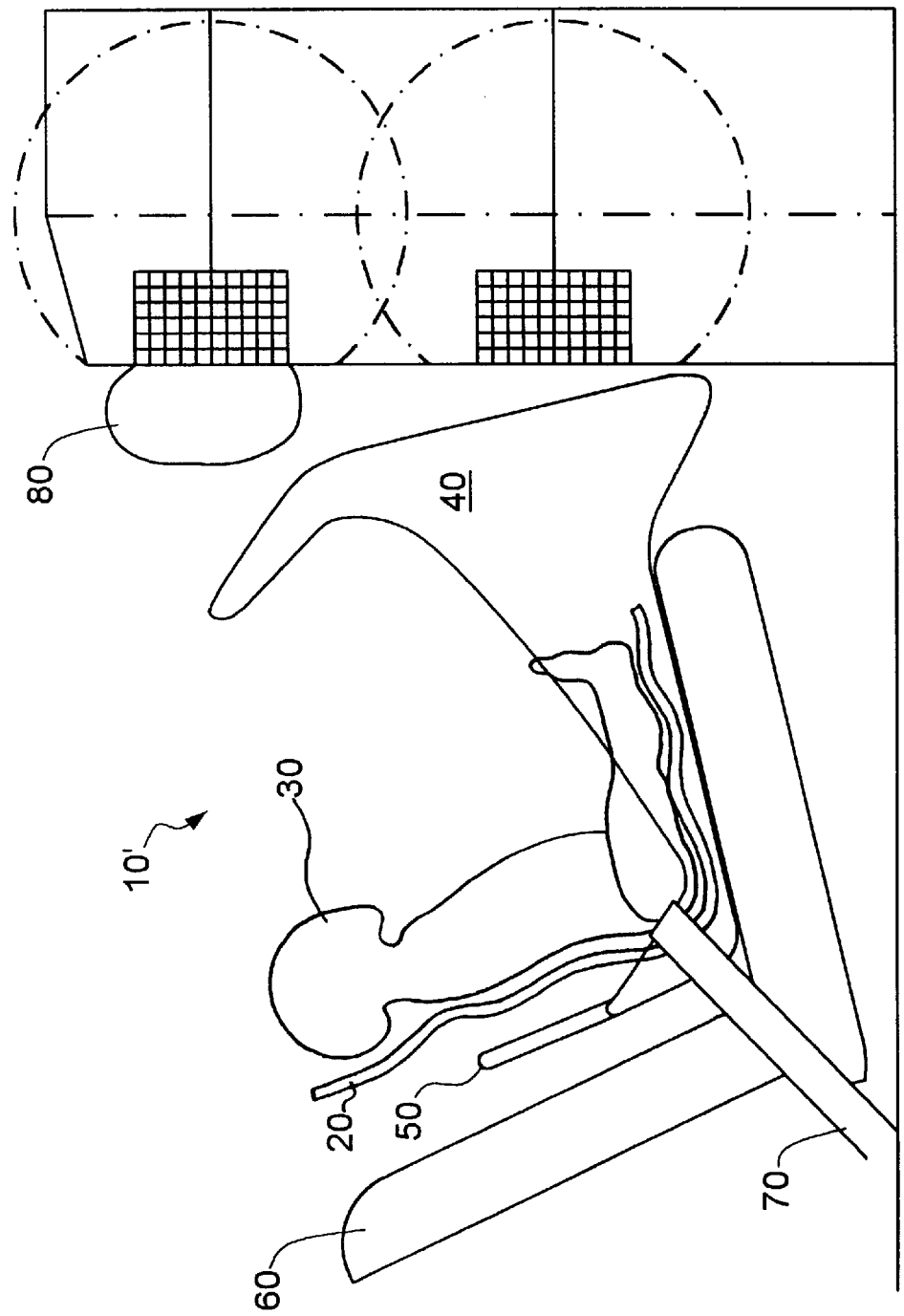
FIG. 11 is a diagrammatic side view of the child safety seat of FIG. 9 as the air bag begins to inflate.

As shown in FIG. 11, at a time of approximately twenty milliseconds after the impact the seat belt 70 continues to stretch and the child 30 and the seat 10' continue forward. At this time the air bag 80 starts to deploy.

Figure 12:
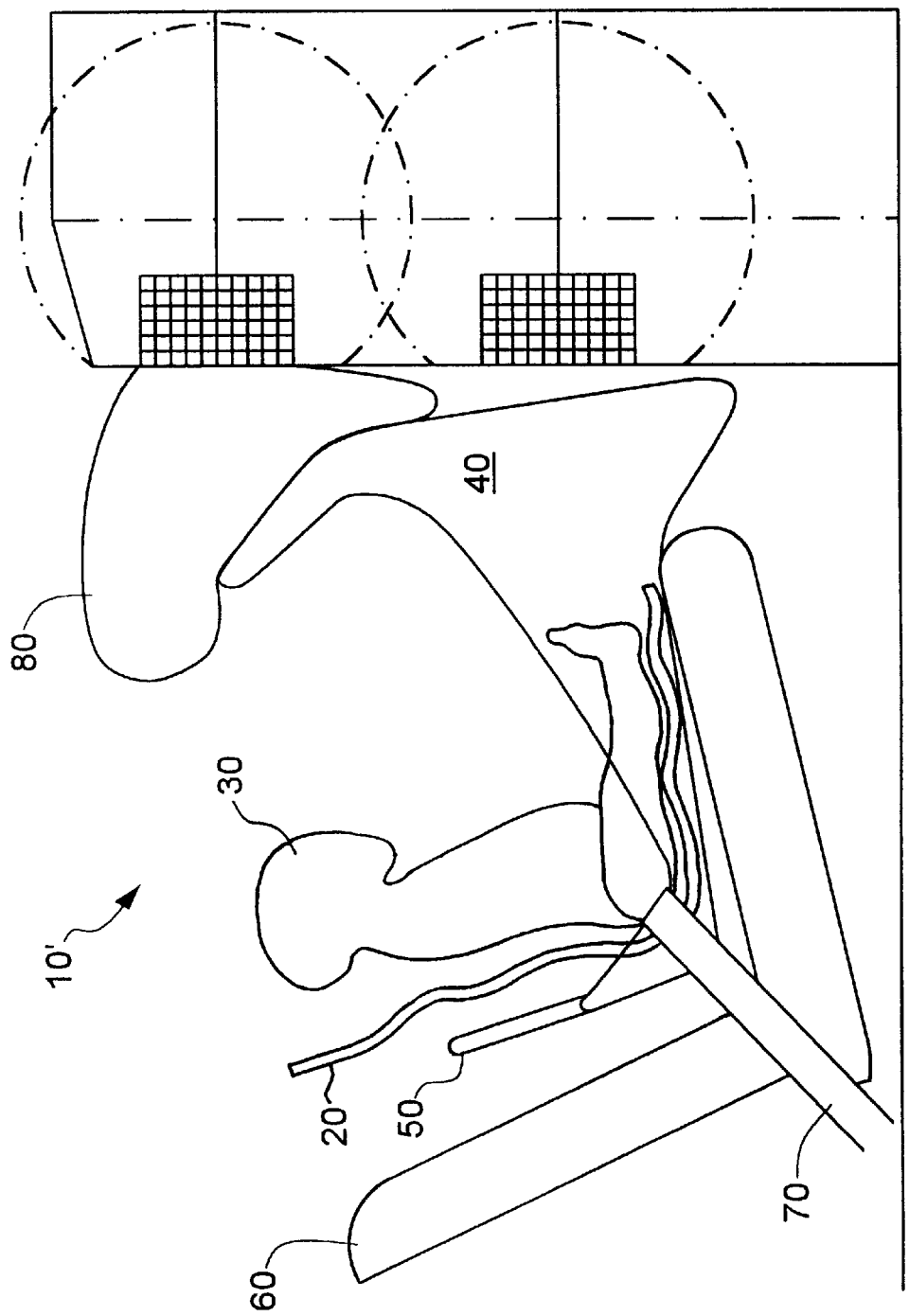
FIG. 12 is a diagrammatic side view of the child safety seat of FIG. 9 with the air bag partially inflated.

Referring now to FIG. 12, at a time of about thirty milliseconds after impact the inflating air bag 80 has encountered the air bag deflector 40 of the child seat 10'. A portion of the energy of the expanding air bag is absorbed by the frame and the air bag deflector 40.

Figure 13:
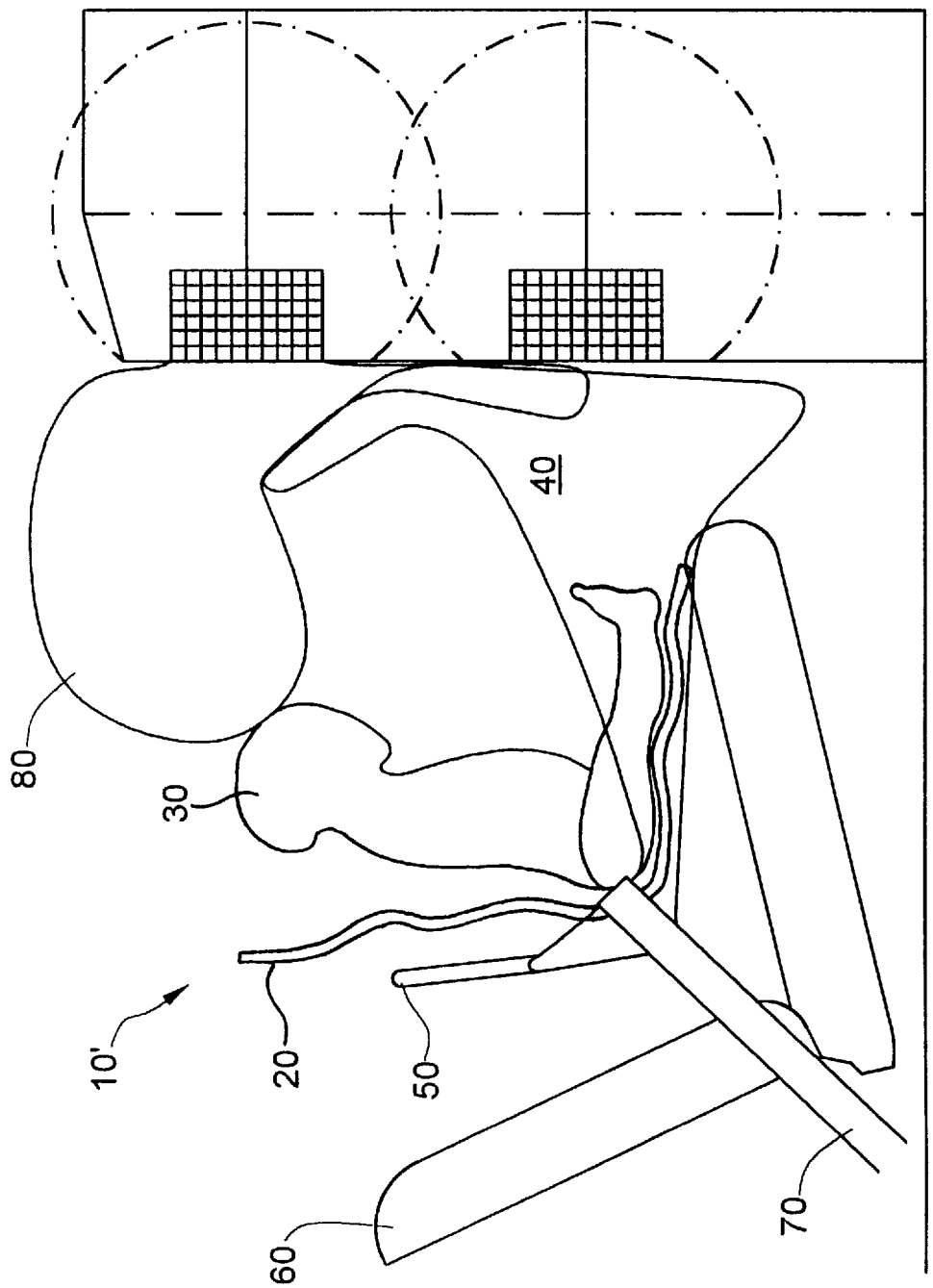
FIG. 13 is a diagrammatic side view of the child safety seat of FIG. 9 with the air bag fully inflated.

As shown in FIG. 13, at a time of about forty milliseconds after impact the child 30 and seat 10' start to translate towards the front of the vehicle. The seat belt 70 is at its elastic limit and the inflating air bag 80 expands over the top of the deflector 40 and encounters the head of the infant 30 thus preventing and cushioning further forward movement of the infant 30 relative to the vehicle.

Figure 14:
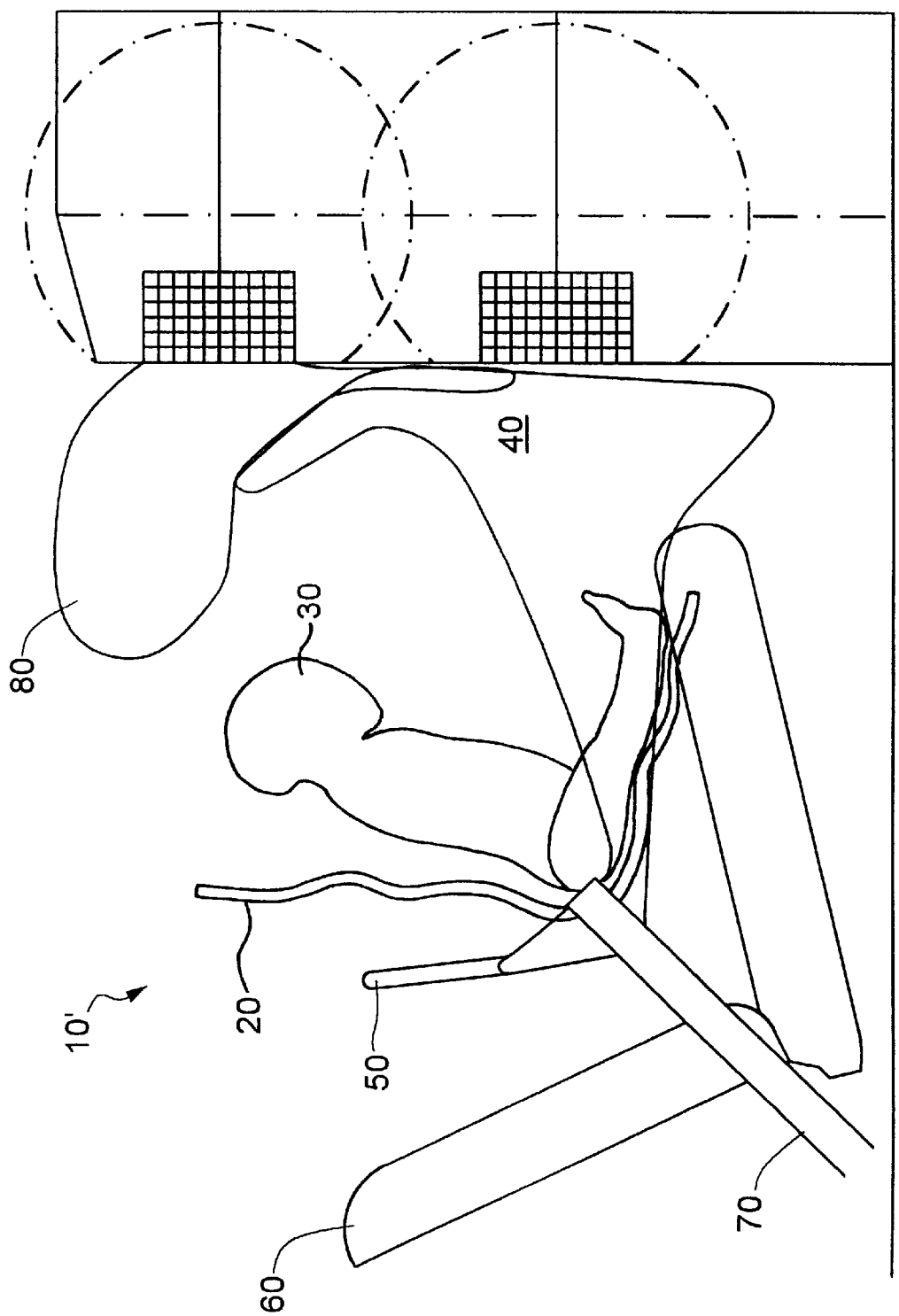
FIG. 14 is a diagrammatic side view of the child safety seat of FIG. 9 as the air bag begins to deflate.

Referring to FIG. 14, at a time of about 50 milliseconds after impact the air bag 80 starts to deflate and the infant 30 and car seat 10' start to return to their original positions.

Figure 15:
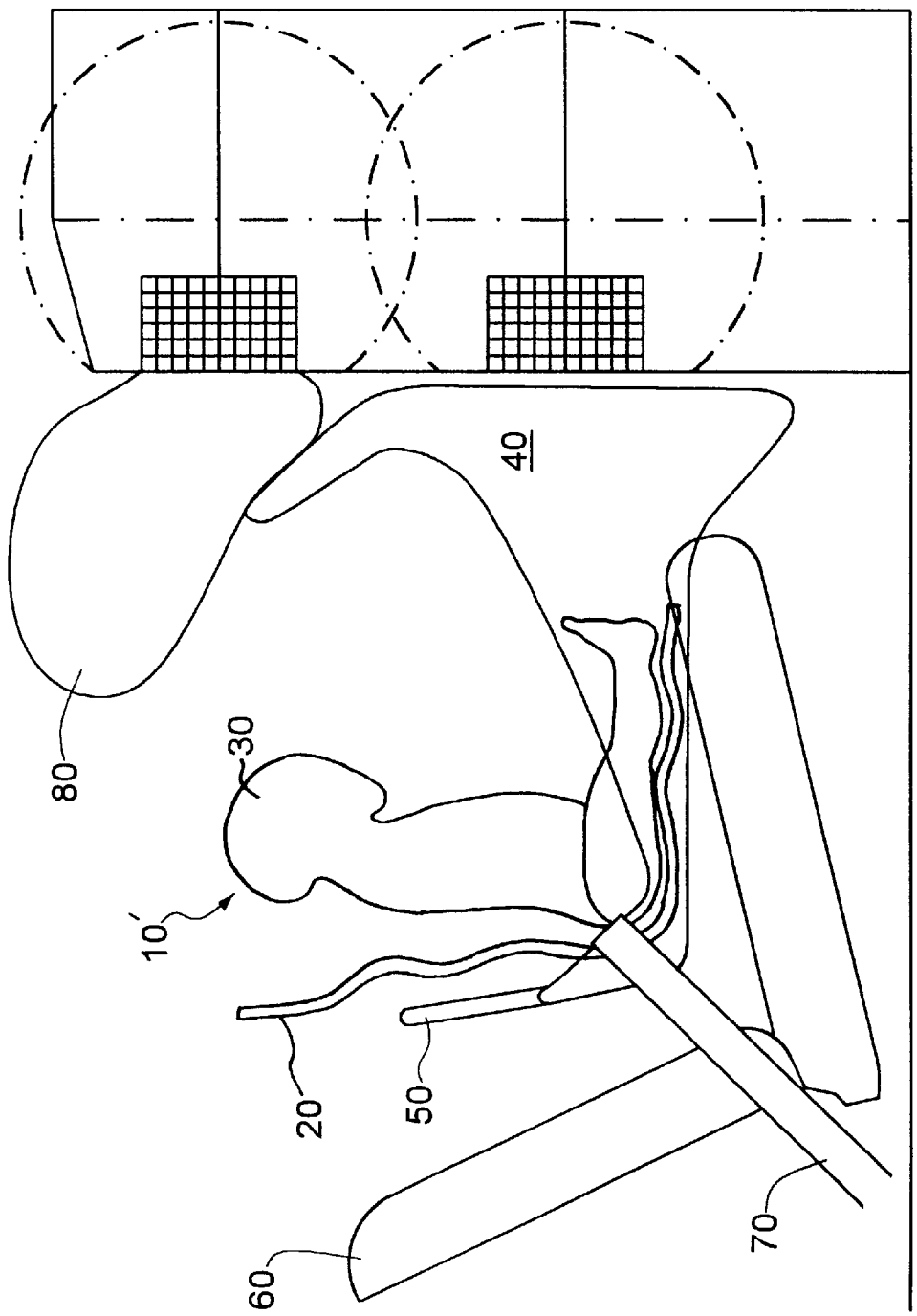
FIG. 15 is a diagrammatic side view of the child safety seat of FIG. 9 with the air bag partially deflated.

As shown in FIG. 15, at a time of approximately 60 milliseconds after impact the air bag 80 has further deflated and the child 30 continues returning back to its original position along with the seat 10'.

Figure 16:
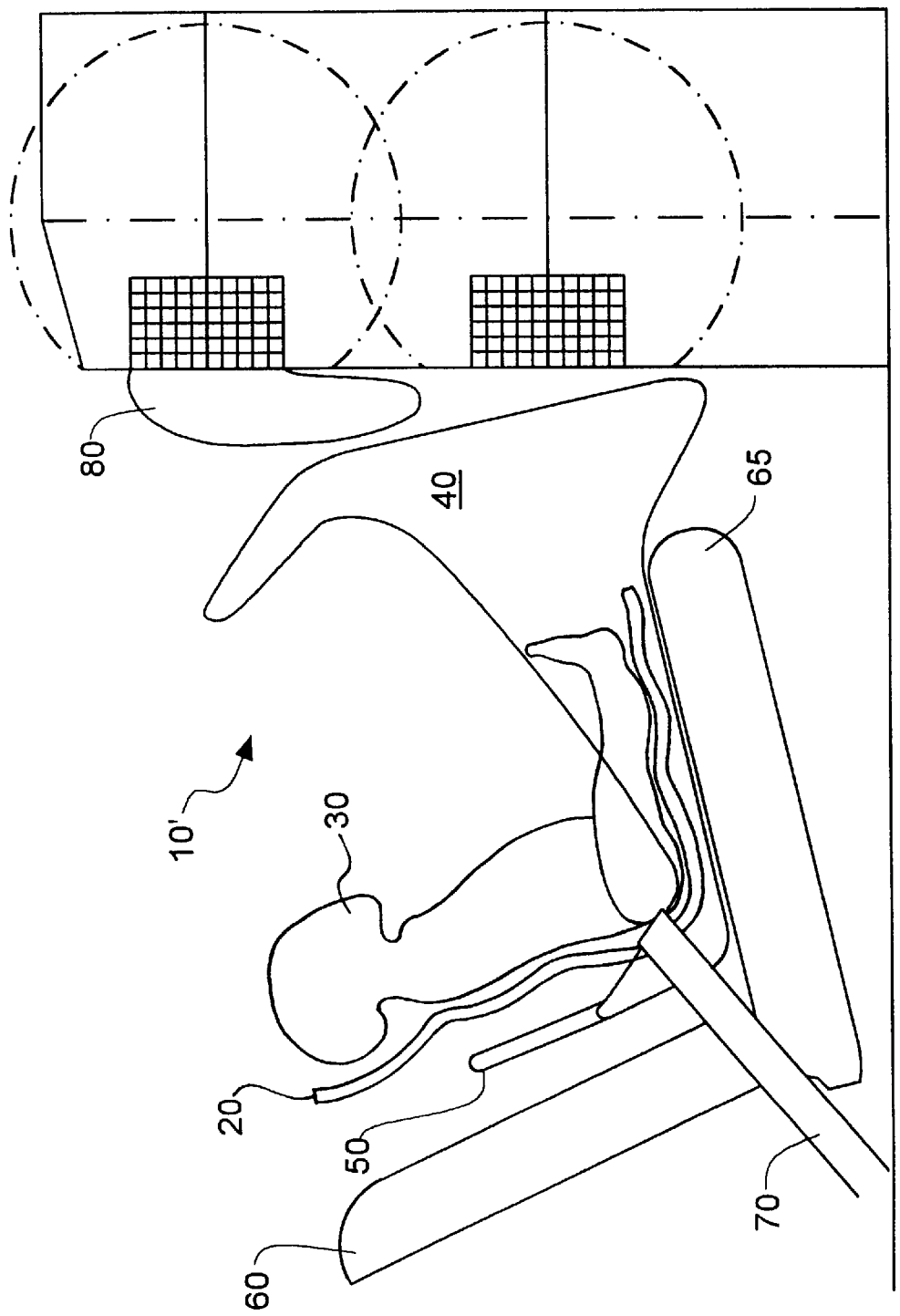
FIG. 16 is a diagrammatic side view of the child safety seat of FIG. 9 with the air bag fully deflated.

Referring now to FIG. 16, at a time of approximately 80 milliseconds after impact the air bag 80 has completely deflated and the seat belts 70 have returned to their pre-impact position, as has the car seat 10' and the infant 30. The noted times are approximate, and are proportional depending on the speed of the vehicle at impact, though the timing recited should be the same or very similar in relationship to one another.

In a further embodiment the cradle is removable from the frame by way of a locking mechanism 90 shown generally in FIG. 17. The locking mechanism 90 is configured such that very little alignment is required in order to position the cradle within the frame. In this embodiment the cradle includes a protuberance 120 which is of semi-circular shape and only fits into a singular spot where it is aligned to be removable engaged from the frame 40. The locking mechanism 90 may be of any style, such as including pieces 96 having a tapered surface 97 which mates with pieces 95 of the frame 40 which also have a tapered surface 98 which matches and abuts against the tapered surface 97 of cradle pieces 96. Once the cradle is inserted within the frame and rotated such that the tapered surfaces are abutting each other the seat is locked in place. The cradle is removed from the frame by rotating the cradle in the opposite direction such that the tapered surfaces 97, 98 of respective pieces 96, 95 are spaced apart from each other, allowing the cradle to be removed from the frame. In an alternate embodiment the mechanism is configured with a funnel shaped portion, while the cradle includes a smaller triangular shaped portion which is directed so that the bottom can only settle in the properly aligned position. any number o flocking mechanisms may be employed for releasably securing the cradle to the frame.

An adjustable knee bracket can be included as part of the convertible and/or rearfacing infant/child seat and allows for larger children to utilize the existing car seat. As shown in FIGS. 18 and 19, the knee bracket 85 is generally triangular in shape. The triangular piece has, for example, a top angle of approximately 90 degrees. For example, utilizing a triangular knee bracket 85 having a base of 11.3 inches with sides of 8 inches, the additional available length would be 4.7 inches, thus for a child having a 32 inch length with approximately 16 inch legs the knee bracket increases the available length by the 4.7 inches. For a 40 inch child with 20 inch legs the increase would be about 5.8 inches etc. Thus the triangular knee bracket 85 extends the useable life time of the infant seat by allowing a larger child to utilize the seat.

The convertible child safety seat provides protection of an occupant in either a forward facing or rearward facing orientation. The convertible child safety seat also protects the occupant from an inflating air bag when the seat is installed in the front passenger-side seat of a vehicle equipped with a passenger-side air bag. The cradle is removable from the frame of the seat. A knee bracket may be included as part of the seat in order to allow larger children to continue use of the seat.

Having described preferred embodiments of the invention it will now become apparent to those of ordinary skill in the art that other embodiments incorporating these concepts may be used. Accordingly, it is submitted that the invention should not be limited by the described embodiments but rather should only be limited by the spirit and scope of the appended claims.

I claim:

1. A convertible child safety seat comprising:
   a frame having a first end, a second end, a height and a width;
   a first cradle;
   a locking mechanism removably securing said cradle within said frame, said safety seat convertible from a first position wherein said cradle is disposed within said frame in a rearward facing orientation toward a first end of said frame to a second position wherein said cradle is disposed within said frame in a forward facing orientation toward a second end of said frame; and
   an air bag deflector disposed at the second end of said frame, said airbag deflector comprising a surface extending substantially along the width of said cradle and extending substantially along the height of said cradle, said airbag deflector operative to deflect an expanding airbag over said cradle and away from direct contact between the expanding airbag and an occupant disposed within said cradle.

2. The convertible child safety seat of claim 1 further comprising an anti-kick bar disposed at the first end of said frame, said anti-kick bar extending substantially horizontally from said first end of said frame, said anti-kick bar operative to engage a seat back and dampen a rebound of said safety seat during an impact.

3. The convertible child safety seat of claim 1 further comprising a knee bracket disposed within said cradle said knee bracket comprising at least two angled surfaces adjacent one another, said knee bracket positioned along a surface of said cradle and operative to support legs of an occupant in an angled manner.

4. The convertible child safety seat of claim 1 further comprising a shock mount removably securing said frame to said cradle, said shock mount operative to isolate said cradle from, forces applied to said deflector and said frame from an expanding air bag.

5. The child safety seat of claim 1, wherein said cradle further comprises a handle.

6. The convertible safety seat of claim 1 wherein the width of said air bag deflector is greater than a width of said cradle.

7. The convertible safety seat of claim 1 wherein said frame comprises:
   a pair of generally parallel side pieces spaced apart from each other;
   a top piece interconnecting said side pieces to each other; and
   a bottom piece interconnecting said side pieces to each other.

8. The convertible safety seat of claim 1 further comprising a second cradle, wherein said first cradle is utilized in the rearward facing orientation and wherein the second cradle is used in the forward facing orientation.

9. The convertible child seat of claim 8 wherein said second cradle is larger than said first cradle.

10. The convertible child safety seat of claim 1 wherein said locking mechanism comprises:
    a cradle protuberance having an angled side surface; and
    a frame recess having a protuberance including an angled side surface and wherein said cradle protuberance is configured to fit within said frame recess and is rotatable within said frame recess from a first position wherein said angled side surface of said cradle protuberance is spaced apart from the angled side surface of said frame recess protuberance to a second position wherein said angled side surface of said cradle protuberance is abutting said angled side surface of said frame recess protuberance.

* * * * *